C. C. ATKINSON.
FERTILIZER DISTRIBUTER.
APPLICATION FILED MAY 20, 1909.
937,563.
Patented Oct. 19, 1909.
2 SHEETS—SHEET 1.
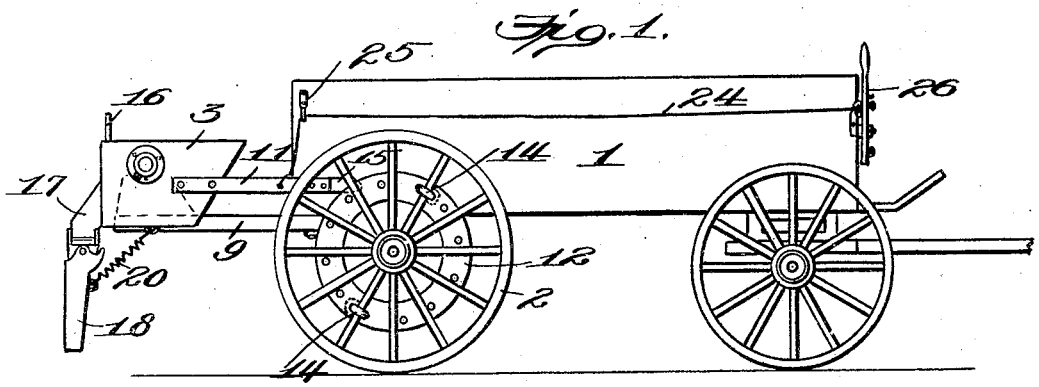
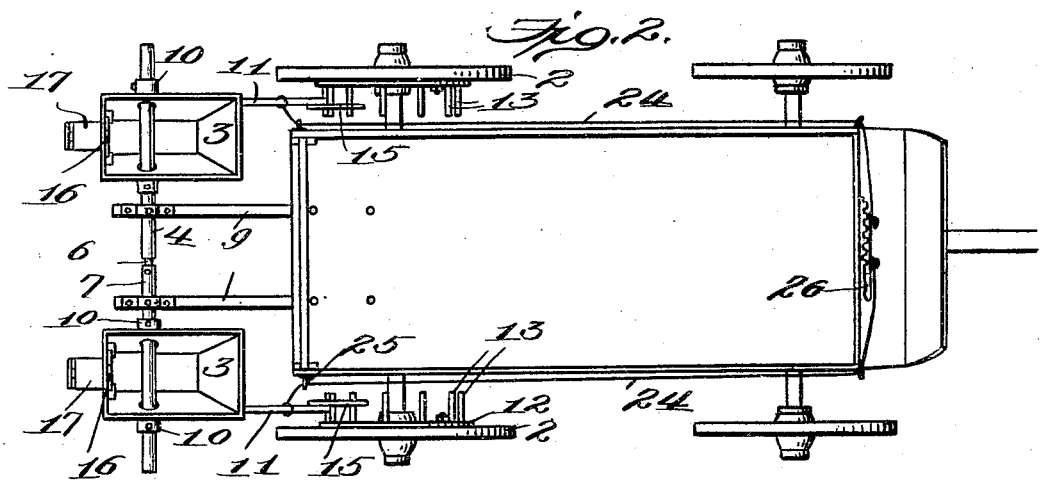
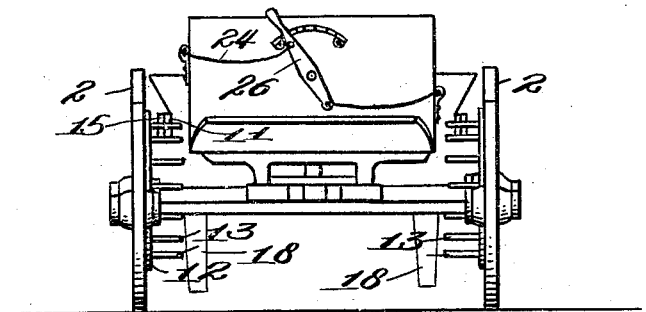
Witnesses:
Inventor
Christopher C. Atkinson
By James L. Norris
Atty.

C. C. ATKINSON.
FERTILIZER DISTRIBUTER.
APPLICATION FILED MAY 20, 1909.
937,563.
Patented Oct. 19, 1909.
2 SHEETS—SHEET 2.
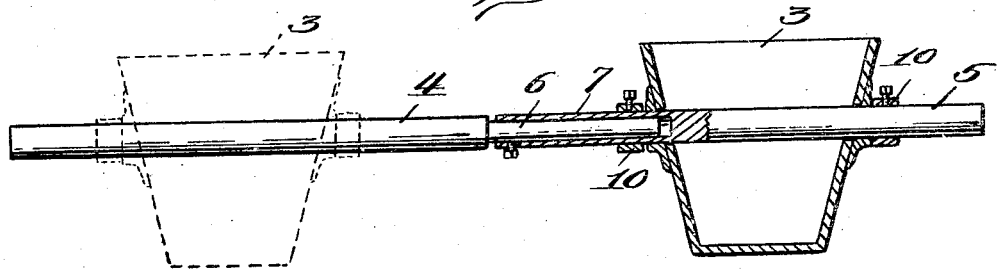
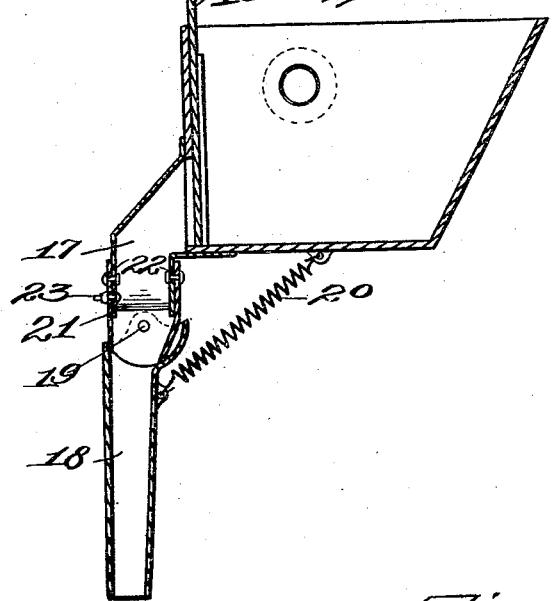
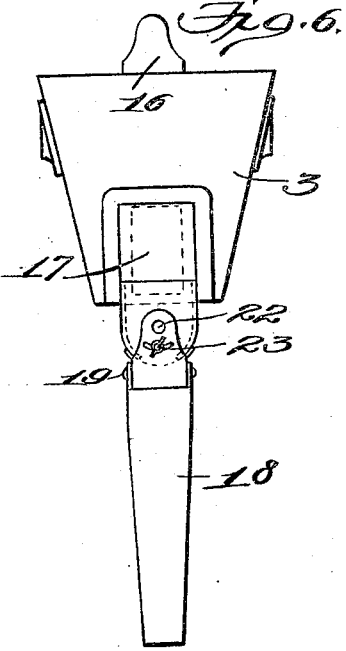
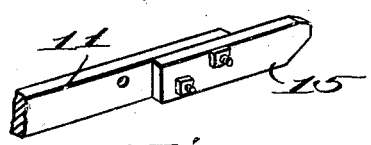
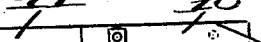
Witnesses
Inventor
Christopher C. Atkinson
By
James L. Norris
Atty.

UNITED STATES PATENT OFFICE.

CHRISTOPHER C. ATKINSON, OF HAWKINSVILLE, GEORGIA.

FERTILIZER-DISTRIBUTER.

937,563.     Specification of Letters Patent.     Patented Oct. 19, 1909.

Application filed May 20, 1909. Serial No. 497,213.

*To all whom it may concern:*

Be it known that I, CHRISTOPHER C. ATKINSON, a citizen of the United States, residing at Hawkinsville, in the county of Pulaski and State of Georgia, have invented new and useful Improvements in Fertilizer-Distributers, of which the following is a specification.

My present invention relates to improvements in distributers for fertilizer and other materials, and it has for its object primarily to provide a simple and improved fertilizer distributer which is capable of being readily attached to an ordinary wagon and operated from the wheels thereof, it comprising preferably a plurality of hoppers which distribute the material in separate rows which hoppers may be adjusted with reference to each other whereby the material may be deposited in rows of different widths, the device may be readily adjusted to vary the amount of material discharged from the machine, and when so desired, the discharging apparatus may be readily set in inoperative condition.

Further objects of the invention are to provide simple and improved actuating devices for the distributing apparatus which may be quickly and easily attached to wagon wheels of the ordinary construction and to provide a spout which is not only yieldable in a direction forwardly and rearwardly of the wagon in order to free itself of obstructions without breakage, but it is also pivoted to swing in a direction transversely of the wagon whereby the material may be deposited in rows at different distances apart.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a side elevation of an ordinary wagon showing a distributer constructed in accordance with the present invention attached thereto; Fig. 2 is a plan view of the structure shown in Fig. 1; Fig. 3 is a front elevation of the wagon having the distributer mounted thereon; Fig. 4 is a detail view of the hoppers, one of the hoppers and its supporting shaft being shown in section to illustrate means for adjusting the distance between the hoppers; Fig. 5 represents a central vertical section through one of the hoppers and the discharge spout therefor; Fig. 6 represents a rear view of the hopper and discharge spout as shown in Fig. 5; Figs. 7 and 8 are detail views showing a device for adjusting the degree of movement of the respective hopper and consequently varying the amount of material discharged thereby; and Fig. 9 is a detail sectional view of an adjustable axle which may be used in connection with wagons or carts to which the distributer is applied.

Similar parts are designated by the same reference characters in the several views.

The present invention provides a distributer of the class described which is capable of being readily applied to and detached from wagons of ordinary kinds, and in the present instance I have shown one embodiment of the invention as an example. It will be understood, however, that the invention is not limited to the exact construction shown, as certain modifications or changes may be made therein in order that the invention may be applied to the best advantage in each particular case.

In the present instance, 1 designates the body of an ordinary wagon and 2 the rear wheels thereof. The distributing attachment may be applied to any desired or convenient part of the wagon. In the present instance, I have shown it applied to the rear thereof and as embodying a suitable number of hoppers to contain the material to be distributed, two hoppers 3 being shown in the present instance. These hoppers are preferably so supported that the distance between them may be readily adjusted so that the distance between the rows may be varied, a pair of shafts 4 and 5 being shown in the present instance one of which is adjustable axially of the other, the inner ends of these shafts in the present instance being arranged telescopically, that is, one has an extension 6 which telescopes within a sleeve portion 7 on the complemental shaft, a set-screw or other appropriate device serving to clamp or secure the two shafts at the desired axial position. These shafts may be rotatable or stationary as desirable, they being shown stationary in the present instance and supported upon the wagon by a pair of arms 9 which may be bolted or otherwise readily attached to the wagon body. The hoppers are in the present instance rotatably supported on the respective shafts and they are prevented from moving endwise thereon by a suitable number of collars 10. These collars in the present instance are shown adjustable longitudinally of the respective shafts and they are arranged at opposite sides of each hopper, each shaft extending through the walls of its hopper and by setting the collars at different points along the two shafts, the distance between the hoppers may further be adjusted. These adjustments provided between the two hoppers not only enable the distance between the rows to be varied, but they also enable the distributer to be readily applied to wagons of different widths.

The material in the present instance is discharged by successive vibrations of the hoppers, and it is generally preferable to impart these movements to the hoppers from the wheels of the wagon as the latter traverses the field. To accomplish this result, each hopper in the present instance is provided with an arm 11 which is rigidly attached thereto and its end is arranged to coöperate with a suitable number of projections which are revolved with the wagon wheels. My present invention also provides a novel means for actuating these hoppers whereby such means may operate efficiently and at the same time they may be quickly attached and detached with reference to the wagon wheels. In the present instance, each actuating device comprises a ring 12 having a suitable number of projections 13 thereon which project preferably inwardly from the wheel, and the ring 12 is so positioned as to be concentric with the axis of revolution of the wheel. This ring carrying the actuating projections may be quickly attached to the wheel by means of a suitable number of clamps 14, a pair of these clamps being shown in the present instance which are shaped at their outer ends to embrace the spokes of the wheel and their inner ends are threaded and provided with nuts for drawing them tight whereby the ring may be easily clamped to the wheel.

In order to vary the degree of vibration imparted to the hoppers, the free ends of the arms 11 which coöperate with the projections 13 on the wheels are shown provided with longitudinally adjustable end sections 15, bolts being shown in the present instance which may coöperate interchangeably with a suitable number of longitudinally spaced apertures in the respective arms whereby the arms 11 may act upon these actuating projections for longer or shorter periods, consequently varying the extent to which these hoppers are vibrated.

In the present instance the material is discharged from the rear ends of the hoppers and, in order to control the discharge of the material, gates 16 are provided which may be set at different elevations so as to vary the area of the discharge opening in the hopper. A discharge spout 17 is preferably provided toward the discharge opening in the hopper which serves to direct the material so as to fall in a row. In some cases, this spout will be sufficient. However, in handling certain classes of material it may be desirable or necessary to employ a conductor for preventing scattering of the material before it reaches the ground. In the present instance, I have shown a conductor 18 which is capable of yielding so that it will not become broken on encountering an obstruction and, moreover, it may be adjusted in a direction transversely of the direction of movement of the wagon whereby the distance between the rows in which the material is deposited may be varied. In the present instance, this conductor is pivotally connected to the lower end of the spout 17 by means of a transverse pivot 19 which enables the conductor to swing about this pivot and in a direction forwardly and rearwardly of the wagon. A tension spring 20 acts normally to yieldably hold the conductor in an operative position, but should the conductor encounter an obstruction, it will temporarily swing rearwardly but upon passing the obstruction the spring will return it to its proper operative position. Any suitable means may be provided for limiting the forward movement of the conductor so that it may return to an operative position after being displaced. In the present instance a plate 21 depends from the spout 17 and it enters the upper end of the conductor and bears against the rear wall thereof, thereby acting as a limiting stop for the purpose described. This plate in the present instance also serves as means for adjusting the transverse position of the conductor whereby the distance between the rows may be varied, this plate in the present instance being pivoted to the spout at 22 whereby it may swing transversely thereof and its lateral edges engage the side walls of the conductor so as to support the latter at the desired lateral inclination, a positioning device such as the thumb or set-screw 23 serving to retain this plate in its adjusted position.

In operating the machine it may be desirable or necessary at times to interrupt the distribution of the material and the present invention provides a simple and efficient device for accomplishing this result, it consisting in the present instance of a pair of cords or other flexible members 24 the ends of which are attached to the respective actuating arms 11 of the hoppers and it is guided by suitable devices 25 placed above such arms, these two cords extending preferably to that portion of the wagon on which is seated the driver and they are connected to a lever or other operating device 26 which in the present instance is pivoted to the body of the wagon and may be provided with a sector or other means for retaining it in the desired position. These cords are attached to the opposite sides of the pivot of this lever so that a movement of the latter in one direction will simultaneously tension both cords and thereby lift both actuating devices into an inoperative position or to a position that will clear the projections upon the wagon wheels.

In order to permit the wheels of the wagon or cart to which the distributer is applied to run in the bottom of the furrows where the earth is firm, a shaft such as that shown in Fig. 9 may be used, the length of which may be adjusted so as to vary the distance between the wheels to correspond with the distance between any two furrows. In the construction shown, the axle is divided into two sections 27 and 28 which carry the journals at their ends for the wheels, and these axle sections are mounted telescopically within a sleeve 29, the latter being suitably secured to the wagon or cart body. The axle sections may be adjusted longitudinally within the sleeve and suitable means may be provided for securing them in any given adjustment, a series of longitudinally spaced apertures 30 being formed in each axle section in the present instance and a bolt or pin 31 which extends through the sleeve and through the appropriate aperture. By this construction, the wheels of the wagon or cart to which the distributer is applied will run in the bottom of each furrow, thereby providing a firmer support than would be obtained should the wheels travel upon the tops of the furrows where the soil is loose and soft.

I claim as my invention:

1. A fertilizer distributing attachment for wagons comprising a shaft adapted to be supported upon a suitable part of a wagon, hoppers spaced longitudinally and rotatably mounted on said shaft, and actuating means operable by the wagon wheels for vibrating the hoppers and controlling the discharge of the material from the hoppers.

2. A fertilizer distributing attachment for wagons comprising a pair of hoppers independently rotatable and capable of relative adjustment to adapt them to wagon bodies of different widths, and actuating means operable from the wheels of the wagon for oscillating the hoppers and controlling the discharge of the material from the respective hoppers.

3. A fertilizer distributing attachment for wagons comprising a shaft having means for supporting it transversely on the wagon, a pair of hoppers spaced longitudinally and rotatably mounted on said shaft, and actuating means operable by wheels at opposite sides of the wagon and connected to the respective hoppers for oscillating them and controlling the discharge of material therefrom.

4. A fertilizer distributing attachment for wagons comprising a shaft having means for supporting it transversely on the wagon, a pair of hoppers rotatably supported on said shaft and adjustable longitudinally thereof to adapt the attachment to wagon bodies of different widths, and means operable from the wheels of the wagon and connected to the respective hoppers for vibrating them to effect the discharge of material therefrom.

5. A fertilizer distributing attachment for wagons comprising a pair of shaft sections connected and capable of relative longitudinal adjustment, a hopper rotatably mounted on each shaft section, and means for vibrating the hoppers to effect the discharge of material from the respective hoppers.

6. A fertilizer distributing attachment for wagons comprising a hopper mounted for vibratory movement and adapted to contain the material, actuating means operable from a wheel of the wagon to effect the discharge of material from the hopper, and means for setting the actuating means in an inoperative condition.

7. A fertilizer distributing attachment for wagons comprising a pair of tiltably supported hoppers, actuating means operable from the wheels of the wagon for vibrating the hoppers, and means for setting the actuating means for both hoppers in an inactive condition.

8. A fertilizer distributing attachment for wagons comprising a shaft having means for supporting it, a pair of hoppers tiltably suspended thereon and provided with actuating arms, and actuating means adapted for attachment to the wagon wheels and coöperative with said arms to vibrate the hoppers and cause the discharge of material therefrom during the traversing movement of the wagon.

9. A fertilizer distributer comprising a tiltably suspended hopper provided with a forwardly extending arm, and actuating means for vibrating the hopper from one of the wagon wheels comprising an annular member having means for connecting it to a wagon wheel and provided with a suitable number of projections to coöperate with said arm.

10. A fertilizer distributer comprising a pair of tiltably supported hoppers provided with actuating arms, actuating means adapted for attachment to wagon wheels at opposite sides of the wagon and embodying projections to impart a series of blows to said arms, and means connected to the arms of both hoppers for setting the actuating means therefor in inactive condition.

11. A fertilizer distributer comprising a vibratory hopper provided with an actuating arm, actuating means adapted for attachment to a wagon wheel and provided with a series of projections, and a part adjustable longitudinally of said actuating arm and co-operative with the actuating means for varying the discharge of material from the hopper.

12. In a fertilizer distributer, the combination of a tiltably supported hopper, means for vibrating the hopper, a spout leading therefrom, and a conductor mounted to receive the material from said spout and to conduct it to the ground, said conductor being adjustable with reference to said spout in a direction transverse to the direction of movement of the wagon whereby the distance between the rows may be varied and also pivoted to permit vibratory movements of the hopper about the axis of the latter.

In testimony whereof I have hereunto set my hand in presence of two subscribing witnesses.

CHRISTOPHER C. ATKINSON.

Witnesses:
D. R. PEARCE,
W. A. LANCASTER.